United States Patent [19]

Brownell

[11] Patent Number: 4,464,263
[45] Date of Patent: Aug. 7, 1984

[54] PLEATED FILTER ELEMENT AND INTEGRAL SHIELD AND METHOD FOR MAKING SAME

[75] Inventor: Peter Brownell, Providence, R.I.

[73] Assignee: Fram Corporation, East Providence, R.I.

[21] Appl. No.: 349,899

[22] Filed: Feb. 18, 1982

Related U.S. Application Data

[63] Continuation of Ser. No. 182,909, Sep. 20, 1980, abandoned.

[51] Int. Cl.$^3$ .................... B01D 27/08; B32B 5/20
[52] U.S. Cl. .................... 210/484; 55/521; 156/79; 156/242; 156/292; 156/294; 210/493.2; 210/493.5; 264/45.7; 264/46.5; 156/253; 428/36; 428/137; 428/316.6; 428/317.5
[58] Field of Search .................... 29/163.5 F; 55/521; 210/493.1, 493.5, 493.2, 484; 428/36, 316.6, 317.5, 137; 156/79, 294, 292, 242, 253; 264/45.7, 46.5

[56] References Cited

U.S. PATENT DOCUMENTS

| | | | |
|---|---|---|---|
| 2,785,805 | 3/1957 | Hough | 210/493.1 |
| 3,164,506 | 1/1967 | Lake | 156/69 |
| 3,216,578 | 11/1965 | Wright et al. | 210/484 |
| 3,246,765 | 4/1966 | Murphy et al. | 210/493.1 |
| 3,246,765 | 4/1966 | Murphy et al. | 210/349 |
| 3,290,870 | 12/1906 | Jensen | 55/486 |
| 3,303,254 | 2/1967 | Simons | 264/219 |
| 3,417,551 | 12/1968 | Bonell | 55/521 |
| 3,417,551 | 12/1968 | Bonell | 55/498 |
| 3,506,475 | 4/1970 | MacDonnell | 210/493.1 |
| 3,570,675 | 3/1971 | Pall | 210/457 |
| 3,662,893 | 5/1972 | Humbert, Jr. | 210/315 |
| 3,692,184 | 9/1972 | Miller, Jr. et al. | 210/437 |
| 3,716,436 | 2/1973 | Pall et al. | 156/218 |
| 3,752,321 | 8/1973 | McLaren | 210/493 |
| 3,813,334 | 5/1974 | Bray | 210/321 |
| 3,871,851 | 3/1975 | Neumann | 55/521 |
| 3,996,322 | 12/1976 | Snelling et al. | 264/45.7 |
| 4,058,463 | 11/1977 | Bartik | 210/493.1 |
| 4,065,341 | 12/1977 | Cub | 156/187 |
| 4,075,106 | 2/1978 | Yamazaki | 210/487 |
| 4,131,702 | 12/1978 | Alter et al. | 428/314 |
| 4,163,721 | 8/1979 | Lobdell | 210/493.1 |
| 4,186,099 | 1/1980 | Henschel | 210/493.1 |
| 4,211,543 | 7/1980 | Tokar | 55/521 |
| 4,227,356 | 10/1980 | Stern et al. | 428/314 |
| 4,247,656 | 1/1981 | Janssen | 428/310 |

FOREIGN PATENT DOCUMENTS

| | | |
|---|---|---|
| 723107 | 2/1955 | United Kingdom. |
| 823648 | 11/1959 | United Kingdom. |
| 1039624 | 8/1966 | United Kingdom. |
| 1205300 | 9/1970 | United Kingdom. |
| 1545057 | 5/1979 | United Kingdom. |
| 2080141 | 2/1982 | United Kingdom. |

Primary Examiner—Robert A. Dawson
Attorney, Agent, or Firm—Ken C. Decker

[57] ABSTRACT

A pleated paper filter element (10) has a fluid-permeable foamed-plastic shield (16) formed on one of its faces to firmly and accurately position the adjacent folds of filter media. The shield (16) is formed in situ and bonds to the filter media without the use of an intermediate adhesive so as to form a unitary structure. A method of making such a filter involves disposing a foamable liquid plastic (34) near a pleated paper filter unit and foaming the plastic. Prior to solidification, the plastic is effective to bond directly to the filter media. A mold (22) for making such a filter element includes a receptacle (28) for receiving a quantity of liquid plastic and a filter unit and for holding them in the proper relation while the plastic is foamed. The mold receptacle includes projections (30) which form perforations (18) in the solidified plastic and which provide for fluid flow communication through the filter element. The plastic may be of the open-cell fluid-permeable type to permit fluid flow communication through the shield to the filter element.

6 Claims, 6 Drawing Figures

PLEATED FILTER ELEMENT AND INTEGRAL SHIELD AND METHOD FOR MAKING SAME

This is a continuation, of application Ser. No. 182,909, filed Sept. 20, 1980 and now abandoned.

The invention relates to a pleated paper filter element having an integral fluid-permeable shield formed on at least one of its faces.

Fluid filters which employ pleated paper filter media are known in the filtering art. A persistent problem in this art is the provision of support to the filter media. Without such support, the filter media is easily displaced from its pleated, uniformly spaced configuration by the pressure differential established across the media incident to the flow of fluid therethrough. Movement of the filter element pleats can result in one or more pleats collapsing upon their neighboring pleats. Collapse of filter element pleats upon neighboring pleats reduces the area available for fluid flow through the filter element. A reduction in the area available for fluid flow through the filter element increases the pressure differential across the filter element. The effect of the collapse of filter element pleats is cumulative. Increased pressure difference across the filter element leads to further collapse and to a further increased pressure differential.

Filter elements are known in accordance with the U.S. Pat. Nos. 3,189,179 and 3,392,843 to McMichael and to Mumby, respectively, in which strips or beads of adhesive are applied to the filter element transversely to the direction of the pleat folds to support and space apart the pleats.

With filter elements of the type illustrated in the McMichael and Mumby patents, the paper filter media receives only localized support and the adhesive renders a portion of the filter media impervious to fluid so that the area available for fluid filtering is reduced.

The invention as claimed is intended to remedy the drawbacks of prior filter elements by providing a pleated paper filter element in which the pleats are maintained in their uniformly spaced relationship and resist collapse due to the fluid pressure difference created across the filter media incident to the flow of fluid therethrough. A fluid-permeable shield is bonded on one face of the filter element. The folds of the filter media are embedded into the shield. Because the shield is formed of shape-retaining plastic, the shield supports and spaces apart the folds of the filter media. The shield extends longitudinally along the folds of the filter media to provide substantially continuous support to the filter media folds.

The advantages offered by the invention are mainly that the filter media receives support entirely along the length of the pleat folds; the fluid-permeable shield is formed integrally with the filter element without the use of adhesives; the shield does not significantly reduce the area of filter media available for fluid filtering; and the media and shield form a unitary structure with good resistance to abrasion and damage during manufacture and use.

Two ways of carrying out the invention are described in detail below with reference to drawings which illustrate only these two specific embodiments, in which.

Figure 1:
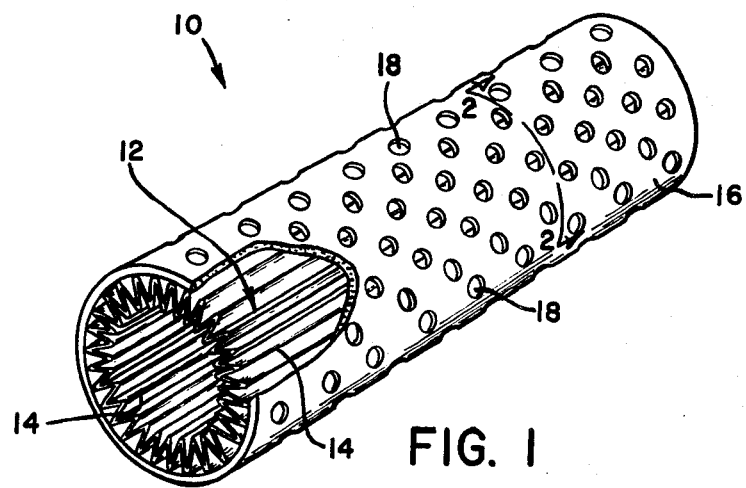
FIG. 1 is a perspective view of a filter element according to my invention with a portion hereof broken away for purposes of illustration.

Turning now to the drawings, FIG. 1 illustrates a filter element 10 according to my invention. Filter element 10 includes a sheet of filter paper 12 having a multiplicity of spaced-apart parallel folds 14 therein. The folds 14 in filter paper 12 are successively disposed in opposite directions so that the sheet of filter paper 12 is pleated. Between the folds 14, the filter paper 12 is substantially straight so that the pleats are V-shaped. The pleated sheet of filter paper 12 is rolled to form a hollow cylinder with the folds 14 parallel to the axis of the cylinder. A fluid-permeable shield 16 circumscribes the cylinder of filter paper. Shield 16 extends longitudinally from one end of the cylinder of filter paper to the other end of the cylinder. A multiplicity of perforations 18 are defined by shield 16 so that fluid may flow through the perforations 18.

Figure 2:
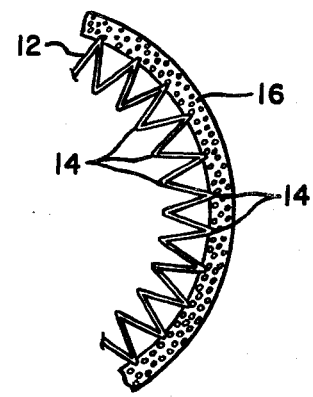
FIG. 2 is a fragmentary sectional view taken along the line 2—2 of FIG. 1.

As is best illustrated by FIG. 2, the outer folds 14 of the filter paper 12 are embedded into the shield 16. The shield 16 is formed of shape-retaining cellular polyurethane plastic so that the shield 16 is structurally self-supporting. Because the polyurethane plastic of shield 16 bonds to the outer folds 14 of the filter paper 12, the filter paper is supported by the shield 16. As will be hereinafter explained, the shield 16 is bonded to the filter paper 12 without the use of an adhesive or bonding agent to hold the shield and the filter paper together.

Figure 3:
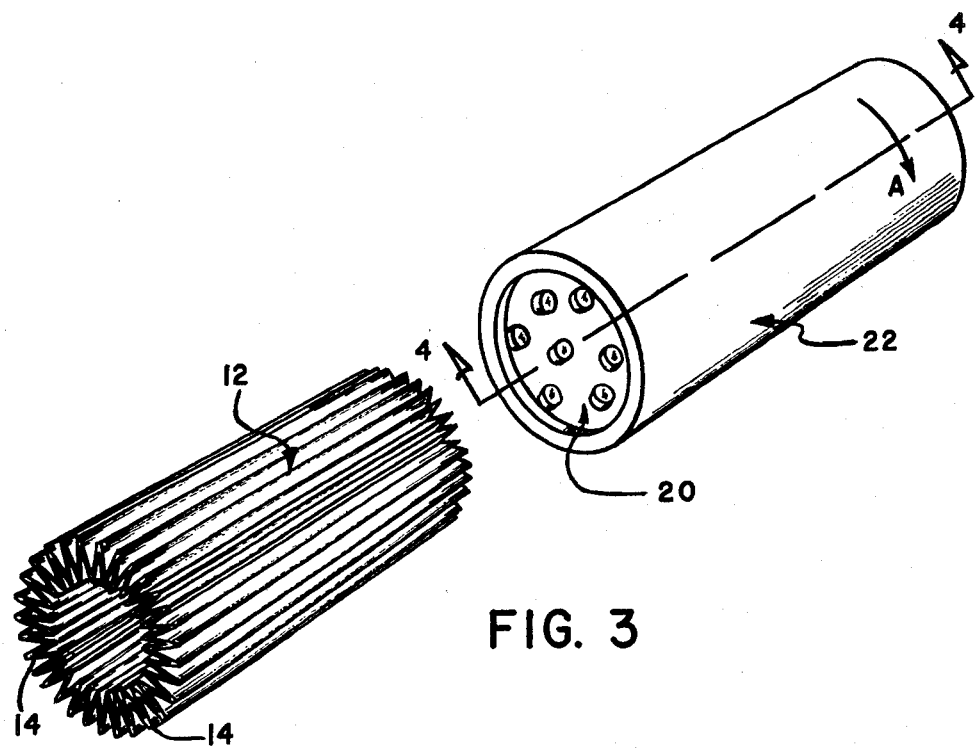
FIG. 3 is a diagrammatic representation of my method for making filter elements according to my invention.
Figure 4:
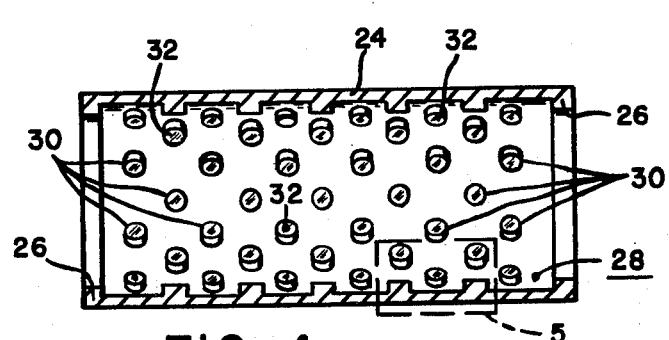
FIG. 4 is a longitudinal sectional view of the mold taken along line 4—4 of FIG. 3.
Figure 5:
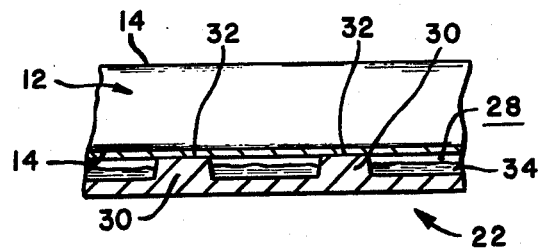
FIG. 5 is an enlarged sectional view of an encircled portion of FIG. 4 and is illustrated with a pleated filter media sheet in the mold preparatory to the formation of a shield on the sheet.

FIGS. 3, 4 and 5 illustrate one method by which shield 16 is formed in situ upon the cylinder of filter paper 12.

FIG. 3 illustrates a pleated and rolled sheet of filter paper 12 preparatory to its insertion into the cavity 20 of a mold 22. Mold 22 is carried by a machine (not shown) which provides for the rotation of the mold 22 about its cylindrical axis, as is illustrated by arrow A, viewing FIG. 3.

Turning now to FIG. 4, it will be seen that the mold 22 includes an elongated cylindrical wall 24. At the ends of the mold are circumferentially continuous annular flanges or dikes 26 extending radially inward from the wall 24. The wall 24 and the dikes 26 cooperate to define a circumferentially-extending basin, or receptacle 28, within the mold 22. The basin 28 is capable of receiving and retaining a liquid therein. A multiplicity of projections 30 extend radially inward from the wall 24 into the cavity 20 of the mold 22. The projections terminate in free ends 32. It will be understood that when the mold 22 is rotated about its cylindrical axis, a liquid may be introduced into the basin 28 defined therein. The liquid will distribute itself eventually about the circumference and along the length of the basin 28 because of the gravitational and centrifugal forces acting upon the liquid as the liquid spins with the rotating mold 22.

FIG. 5 illustrates the encircled portion of FIG. 4 to an enlarged scale. A foamable liquid plastic material 34 is evenly distributed in the basin 28 of mold 22. The plastic material 34 is one of a number of types of foamable liquid plastics which are well known to those skilled in the art. For example, the plastic material 34 may be polyester resin plus aromatic diisocyanate, which together form a resin prepolymer. The resin prepolymer reacts with water to form a urethane polymer which is cellular. The reaction of the resin prepolymer with water produces bubbles of carbon dioxide gas in the urethane polymer so that the volume of the urethane polymer is increased by the gas bubbles. Additionally, the reaction of the resin prepolymer with water polymerizes the prepolymer so that the expanded cellular polymer is a shape-retaining solid. FIG. 5 further illustrates a pleated and rolled sheet of filter paper 12 inserted into the cavity 20 of the mold 22. The outer folds 14 of the filter paper 12 rest upon the free ends 32 of the projections 30 so that the filter paper is spaced from the liquid plastic 34. Because the chemical reaction between the resin prepolymer and the water does not start immediately when the resin prepolymer and water are mixed, the mixture is introduced into the basin of mold 22 as a liquid and the liquid plastic is distributed as the mold spins. The pleated and rolled sheet of filter paper 12 is inserted into the cavity 20 of the mold 22 before the liquid plastic 34 begins to foam. When the liquid plastic foams, it expands in volume and contacts the outer folds 14 of filter paper 12. While foaming, the plastic 34 is effective to bond to the filter paper 12. The volume of liquid plastic material which is introduced into the basin 28 of the mold 22 is selected so that the expanded plastic touches the outer folds 14 of the filter paper 12. Consequently, the outer folds 14 of the filter media 12 embed themselves into the foaming plastic material. Upon solidification, the foamed plastic material forms the shield 16 on the filter element 10. The projections 30 cause the shield 16 to be formed with perforations 18 therein.

Those skilled in the manufacturing arts will recognize that mold 22 is provided with means (not shown) which provide for the release of the finished filter element 10 from the cavity 20 of the mold 22. Means for releasing a part from a mold cavity are well known to those skilled in the art. For example, the mold may be segmented to allow separation of the component parts of the mold along radial planes which are parallel to the cylindrical axis of the mold.

Figure 6:
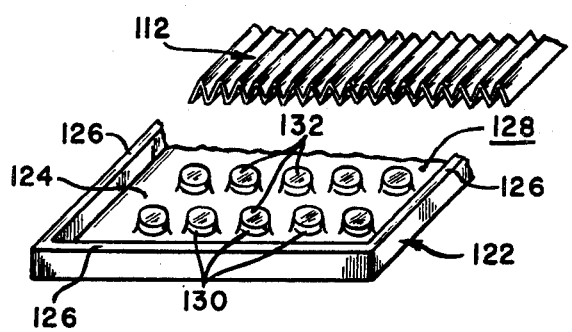
FIG. 6 is a fragmentary perspective view of a mold and pleated sheet of paper filter media for use in making another embodiment of my invention.

FIG. 6 illustrates a mold 122 and a pleated sheet of filter paper 112 for use in making another embodiment of my invention. The filter element is to be flat rather than cylindrical. Consequently, the mold 122 is of a planar design. The mold 122 includes a bottom wall 124 and peripheral dikes 126. The wall 124 and the dikes 126 cooperate to define a basin 128. Projections 130 extend upward from the wall 124 and terminate in free ends 132. A foamable liquid plastic is introduced into the basin 128 of the mold 122. The sheet of pleated filter paper 112 is placed upon the free ends 132 of the projections 130. When the liquid plastic foams and solidifies, a shield is formed on the pleated sheet of filter paper 112, as has been explained with regard to the embodiment of the invention illustrated by FIGS. 1-5.

Those skilled in the art will recognize that a planar filter element made with the mold illustrated by FIG. 6 may be rolled with the shield 16 innermost. Another shield may then be formed on the outside of the filter paper by the use of the mold illustrated by FIG. 3. The finished filter element combines the advantages of both inner and outer support to the filter paper.

The use of a filter element according to my invention corresponds to the use of filter elements now in the art. The filter element may be incorporated into a disposable cartridge or it may be employed in a cannister. It will be further understood that the foamed plastic material used to form the shield on the filter element may be of an open-celled character. Open-celled foamed plastics are inherently fluid-permeable so that perforations in the shield are not necessary to allow fluid flow through the shield.

I claim:

1. An integral filter element comprising:
    a sheet of filtering media, said filtering media sheet having a multiplicity of substantially parallel elongated folds therein, said folds being successively disposed in opposite directions to provide a plurality of elongated V-shaped pleats in said filtering media sheet, said pleats defining like-disposed folds, said sheet being joined at its ends and rolled to define an annular filter having inner and outer diameters with its pleats parallel to the axis of the annulus so that the pleats define inner and outer apexes at respectively the inner and outer diameters of said annular filter; and
    a fluid-permeable, shape-retaining, structurally self-supporting shield circumscribing the outside of said annular filter and integrally bonded to the like-disposed folds of said filtering media sheet, said shield being formed of a shape-retaining, structurally self-supporting, fluid permeable cellular plastic and laterally extending from one like-disposed fold to the next adjacent like-disposed fold so as to space apart said folds, said shield further extending longitudinally along said like-disposed folds and providing a substantially continuous bond between said shield and said like-disposed folds to restrain like-disposed folds from movement relative to said shield, said bond being formed by partially embedding the outer apex of each V-shaped pleat into said shield during the transition of the shield from a foamed liquid to said shape-retaining solid, the portion of each pleat between the inner and outer apexes thereof being unsupported by said shield.

2. The invention of claim 1 wherein said cellular plastic is a polyurethane compound.

3. The method of making a filter element characterized by the steps of:
    providing a cylindrical receptacle having inwardly facing annular flanges to define a circumferentially extending basin;
    placing liquid plastic material of a foamable character in said receptacle;
    rotating said cylindrical receptacle about its longitudinal axis to distribute said plastic material evenly about the inner cylindrical surface of said basin;
    suspending a paper filter media having a plurality of V-shaped pleats radially within said receptacle and spaced a selected distance from said liquid plastic material;
    foaming said plastic material and expanding its volume so that said plastic material contacts said filter media at the apex of each V-shaped pleat to embed each pleat therein; and
    solidifying said plastic material into an annular shape-retaining solid such that said filter media is integrally bonded to said plastic and forms a unitary structure.

4. The invention of claim 3 including the step of forming multiple perforations through the plastic material.

5. The invention of claim 3 wherein said receptacle includes a multiplicity of projections for spacing said filter media away from said foamable liquid plastic, said projections forming perforations in the solidified plastic so that the solidified plastic is fluid-permeable.

6. An integral filter element comprising:

a sheet of filtering media, said filtering media sheet having a multiplicity of substantially parallel elongated folds therein, said folds being successively disposed in opposite directions to provide a plurality of elongated V-shaped pleats in said filtering media sheet, said pleats defining like-disposed folds, said sheet being joined at its ends and rolled to define an annular filter with its pleats parallel to the axis of the annulus; and a fluid-permeable, shape-retaining, structurally self-supporting shield circumscribing the outside of said annular filter and integrally bonded to the like-disposed folds of said filtering media sheet, said shield being formed of a shape-retaining, structurally self-supporting, fluidpermeable cellular plastic and laterally extending from one like-disposed fold to the next adjacent like-disposed fold so as to space apart said folds, said shield further extending longitudinally along said like-disposed folds and providing a substantially continuous bond between said shield and said like-disposed folds to restrain like-disposed folds from movement relative to said shield, said bond being formed by partially embedding the apex of each V-shaped pleat into said shield during the transition of the shield from a foamed liquid to said shape-retaining solid, said shield being of a closed-cell character, said shield including a multiplicity of perforations therethrough.

* * * * *